March 26, 1940.  C. R. HUBBARD  2,194,943

ARMORED MACHINERY PACKING

Filed July 13, 1939

INVENTOR
Cecil R. Hubbard,
BY
Fraser, Myers & Manley.
ATTORNEYS.

Patented Mar. 26, 1940

2,194,943

UNITED STATES PATENT OFFICE 2,194,943

ARMORED MACHINERY PACKING

Cecil R. Hubbard, Palmyra, N. Y., assignor to The Garlock Packing Company, Palmyra, N. Y., a corporation of New York Application July 13, 1939, Serial No. 284,283

3 Claims. (Cl. 288—11)

This invention relates to improvements in armored machinery packings, and is a specific variation or development of the flexible gasket disclosed and claimed in my prior patent, No. 2,066,270, of December 29, 1936. It is an object of the present invention to provide any desired part of a gasket having a plastic body portion, which is designed to be subjected to exacting conditions of service exceeding those to which other parts need be exposed, with a shield of a character such as to prevent cold flow or extrusion of the plastic material and to protect the plastic material from injury which would result from exposure to the high temperature or deleterious chemical elements of the fluid within the structure a joint of which is sealed by the gasket, without materially impairing the flexibility of the gasket and without the necessity of resorting to the tubular shield construction disclosed in my prior patent.

In the prior art will be found examples of gaskets having parts protected by shields corresponding in some respects with the one to be herein disclosed and claimed. As was explained in my prior patent, it has been proposed to make such shields of sheet lead or of canvas, or to use for such purpose a helix or coil of wire, but, as was also explained, such constructions were found to be defective in one respect or another, and the tubular construction of my prior patent was resorted to in an attempt to provide an armored gasket having the flexibility of gaskets of the prior art to which reference was made and at the same time having the greater strength necessary to satisfactorily resist cold flow or extrusion and otherwise protect the plastic element of the gasket from the exacting conditions of service to which such an article may be subjected.

It is the purpose of the present invention to provide a satisfactory shield for a gasket which will have all the meritorious properties of the one described and claimed in my prior patent, but which can be readily cut from a piece of wire screen cloth and so folded and applied to the plastic element of the gasket as to afford the necessary protection and avoid exposure of raw edges without the necessity of resorting to the use of the tubular braided construction of the invention of my prior patent.

In the accompanying drawing illustrating the preferred form of the invention herein to be disclosed and claimed, Figure 1 is a fragmentary view, partly in cross section and partly in perspective, of an armored gasket embodying the invention;

Figure 5:
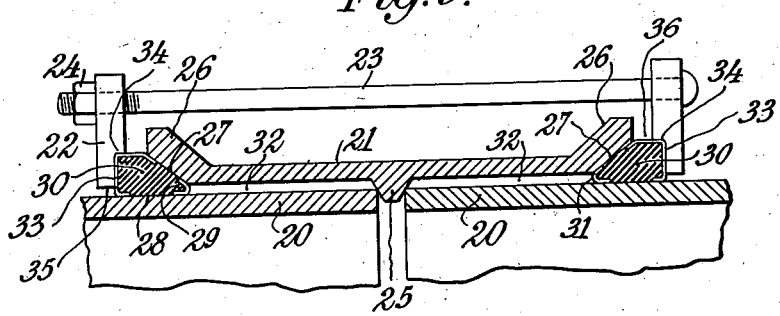
Fig. 5 is a cross-sectional view of parts of a pipe connection having joints sealed by armored gaskets each embodying the invention.

The part of a pipe connection illustrated by Fig. 5 is one example only of many mechanical constructions having joints which might be sealed by gaskets or armored packings embodying the invention to be hereinafter set forth. It comprises satisfactory means whereby a pair of pipe ends 20, 20 may be secured together by a cylindrical coupling 21, a pair of clamping rings 22, and a series of bolts and nuts, 23 and 24 respectively, whereby the clamping rings may be forcibly drawn towards each other.

The coupling 21 may preferably be provided with an inwardly directed, central, annular shoulder 25, which may serve as a stop for the opposed ends of the pipes 20, and the opposite ends of the coupling may be provided with inclined flanges 26, the inner flaring or conical walls 27 of which may cooperate with adjacent cylindrical portions 28 of the pipe ends to provide annular channels of a form adapted to receive annular wedge-like portions 29 of a pair of armored gaskets 30 embodying the invention here under consideration.

Gaskets intended for use in sealing joints of a pipe connection such as that illustrated by Fig. 5 will preferably be provided with shields 31 to protect the entering margins of the wedge-like portions 29 of the gaskets which face the joints 32 between the pipe ends and the coupling, and such gaskets may also be preferably provided with shields 33 to protect the heels or butt ends of the gaskets which make contact with the clamping rings 22.

The inner faces of the clamping rings 22 adjacent the surfaces of the pipe ends 20 may preferably be provided with annular recesses 34 to receive the outer angular portions of the butt ends of the gaskets, and the shields 33 will be so disposed as to reinforce and protect surface portions of the gaskets along the joints 35 between the clamping rings 22 and the pipe ends 20 and the joints 36 between the clamping rings 22 and the flared flanges 26 of the coupling.

Figure 1:
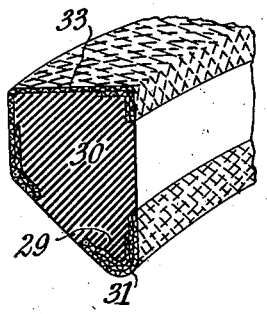
Figure 3:
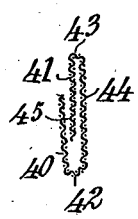
Fig. 3 is a view in cross section of a folded strip of the material illustrated by Fig. 2 adapted to serve as a shield for one part of the gasket illustrated by Fig. 1.
Figure 2:
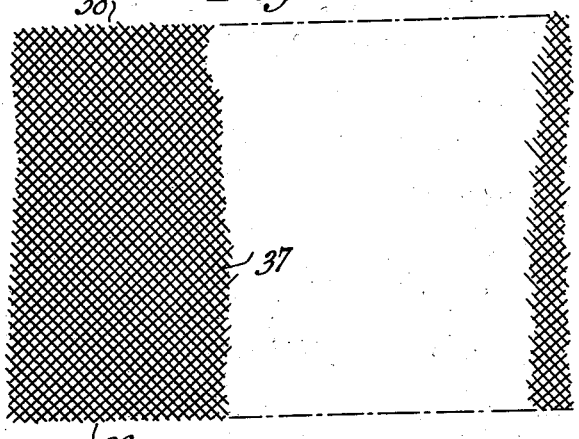
Fig. 2 is a plan view of a fragment of a strip of material cut from a piece of wire cloth, the marginal portions of which may be folded to provide a shield for a gasket such as is illustrated by Fig. 1.

As best illustrated by Figs. 1, 2 and 3, the shield 31 for the gasket 30 may be constructed by first cutting on the bias a strip of material 37, having parallel edges 38, 39, from a piece of closely woven wire screen cloth such as is illustrated by Fig. 2. Outer portions 40, 41 of this strip of bias-cut wire cloth may then be turned or folded inwardly along the margins 42, 43 of a central portion 44, as illustrated by Fig. 3. In cutting and folding the strip, the portions 40, 41 should be of such widths, as compared with the portion 44, as to overlap along a central zone at 45, in order to form a satisfactory guard or protector for the part of the shield 31 which overlies the leading wedge-like portion of the gasket. The shield as thus constructed, having three superimposed layers of material overlying the leading marginal portion of the wedge-like part of the gasket which is exposed at the joint 32 (Fig. 5), so completely covers the underlying plastic material as to prevent cold flow or extrusion and protect the same from damage by exposure to high temperature gases or destructive chemical elements.

Figure 4:
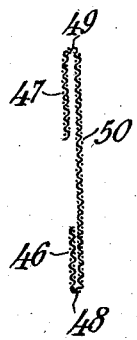
Fig. 4 is a view in cross section of a shield of slightly different form, which may be made by folding the marginal portions of a strip of material such as is illustrated by Fig. 2, and applied to a different part of the gasket illustrated by Fig. 1.

The shield 33 for the gasket 30 may also be formed from a strip of material of suitable width, such as that illustrated by Fig. 2, by bending edge portions 46, 47 inwardly about the margins 48, 49 of a central portion 50, as illustrated in cross section by Fig. 4. In so forming the shield 33 the inwardly folded marginal portions 46 and 47 should be of sufficient width to afford satisfactory protection against extrusion at the joints 35 and 36 (see Fig. 5) when the clamping rings 22 are drawn up tightly by the bolts 23 in order to force the gaskets 30 into the channels between the surfaces 27 and 28 of the coupling 21 and pipe ends 20.

It will be apparent that the construction of the shields by folding the material in such manner as to provide three layers over the advancing edge of the wedge-like part of the gasket and two layers over each of the joints between the clamping element and the pipe ends and coupling results in economy of material as well as in a mechanical advantage in that it permits the use of wire screen cloth of a relatively light and open character, a single thickness of which might not afford the required protection along the zones of the gasket which must be subjected to the most exacting conditions of service, but which detracts from the flexibility of the gasket as a whole to a much less extent than would the use of a heavier and more closely woven wire cloth any part of which would serve as a satisfactory shield or protector for the zones along the gasket which must resist the unusually exacting conditions of service.

The construction of the shields by folding the marginal portions inwardly and then applying them to the gasket with the folded portions between the exposed central portion and the body of the gasket satisfactorily covers all raw edges and thus avoids the necessity of resorting to the tubular construction disclosed in my aforesaid prior patent, which must necessarily be of an equally close formation throughout.

What has been referred to herein as the plastic body portion of the gasket 30 may be constructed of rubber composition or any other plastic or semi-plastic material of similar physical characteristics.

As will be obvious, the gasket may be constructed in the form of a continuous annular packing ring, or the gasket material may be made up in coils of stock from which lengths of proper dimensions may be so cut as to form packing rings having overlapping ends or ends which meet along diagonal planes in a manner well known in the art.

The wire screen cloth 37 from which the shields 31 and 33 are constructed may be made of brass, copper, bronze, or any other material of strength sufficient to serve the intended purpose of preventing extrusion of the underlying plastic material, of protecting the plastic material from damage resulting from exposure to fluids of high temperature or fluids containing injurious chemicals, and of otherwise withstanding exacting conditions of service during shipment, storage and use to which the gasket may be subjected.

It should be apparent from the foregoing description that a gasket provided with shields constructed in accordance with the herein disclosed invention will be substantially as flexible as one made of rubber composition or similar plastic or semi-plastic material alone, thus adapting it to yield or change its form to the required degree when being assembled with pipe ends, couplings or other elements of a joint to be sealed and forced into engagement with opposing surfaces and maintained in such engagement under a desired degree of pressure.

The invention is not intended to be limited to the specific form herein selected and disclosed for purposes of illustration, but should be regarded as including variations and modifications thereof within the scope of the appended claims.

What is claimed is:—

1. An armored gasket comprising a body portion of plastic material and a flexible shield, applied to and extended along a portion of its surface including a relatively narrow zone designed to withstand exacting conditions of service exceeding those to which other parts need be subjected, the said shield comprising a folded strip of closely woven, bias-cut wire screen cloth, the folded portions of the strip being extended inwardly from opposite margins of an intervening exposed portion and confined between said exposed portion and the underlying part of the body portion to which the shield is applied, and the folds being so disposed that a plurality of layers of the woven material will overlie the zone to be subjected to excessively exacting conditions of service.

2. An armored gasket, as defined by claim 1, of which the plastic body portion has a wedge-like part adapted to be forced into a joint between two parts to be sealed, and of which the shield is so applied as to extend along and cover the entering marginal portion of the said wedge-like part and adjacent portions of its convergent surfaces, the inwardly folded portions of the shield being of widths such as to overlap along the part which overlies the marginal portion of the wedge-like part.

3. An armored gasket, as defined by claim 1, of which the plastic body portion has two relatively narrow parallel zones each designed to withstand exacting conditions of service exceeding those to which other parts need be subjected and an intermediate zone adapted to be subjected to the pressure of a gasket-clamping element, and of which the shield is so applied as to extend along and cover the three aforesaid zones, the inwardly folded portions of the shield being of widths such that each may cover and extend beyond that one of the zones, designed to withstand excessively exacting conditions of service, which is adjacent the margin of the shield at which it is inturned.

CECIL R. HUBBARD.